April 20, 1943.  M. MAAG  2,316,877

MICROMETER GAUGE

Filed March 4, 1941  2 Sheets-Sheet 1

INVENTOR
MAX MAAG
BY Joseph K. Schofield
ATTORNEY

April 20, 1943.  M. MAAG  2,316,877
MICROMETER GAUGE
Filed March 4, 1941  2 Sheets-Sheet 2

INVENTOR
MAX MAAG
BY Joseph K. Schofield
ATTORNEY

Patented Apr. 20, 1943

2,316,877

UNITED STATES PATENT OFFICE 2,316,877

MICROMETER GAUGE

Max Maag, Zurich, Switzerland

Application March 4, 1941, Serial No. 381,687

8 Claims. (Cl. 33—178)

The present invention relates to micrometer gauges, especially designed and adapted for use in determining the diameter of holes and bores of work pieces and also to ascertain whether a bore differs in diameter from a reference standard.

The invention relates more particularly to micrometer gauges of the type aforesaid in which a conical member is axially displaced and thereby moves radially disposed gauging members or pins against the wall of the bore of which the exact diameter is to be ascertained.

The axial displacement of the said conical member is proportional to the radial displacement of the gauging pins and therefore also proportional to the diameter of the bore being measured or gauged or which is to be compared with the standard size bore.

The main object of the invention consists in the provision of a micrometer gauge measuring with a very high accuracy and which allows measurements to be taken very quickly. Moreover the new gauge may be easily adapted to measure bores of very different lengths and diameters.

The adaptability and usefulness of the new micrometer gauge is due to the particular construction and combination of the parts as fully described hereinafter.

This application is a continuation in part of my co-pending application Serial No. 343,627, filed July 2, 1940.

In the accompanying drawings several forms of micrometer gauges are shown by way of examples.

Figure 5:
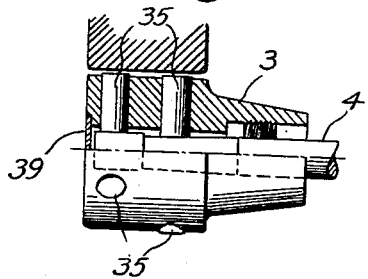
Figure 6:
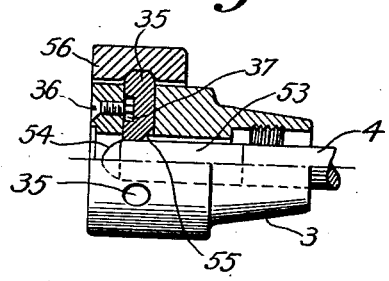

Figs. 5 and 6 each illustrate, partly in section and partly in side elevation, the cooperation of the conical member and the radially movable gauging pins or members.

Figure 7:
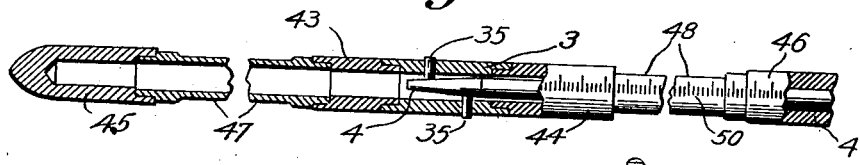
Figure 8:
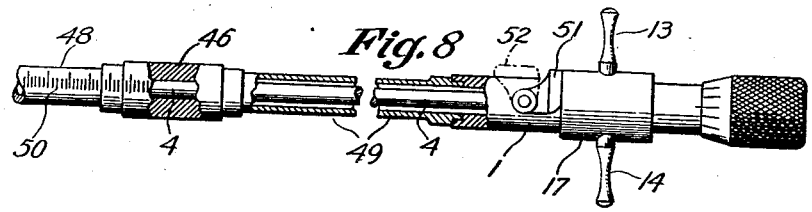

Figs. 7 and 8 show a gauge partly in section adapted to take measurements in bores of very great length, one end of the complete gauge being shown in Fig. 7 and the opposite end in Fig. 8.

Figure 9:
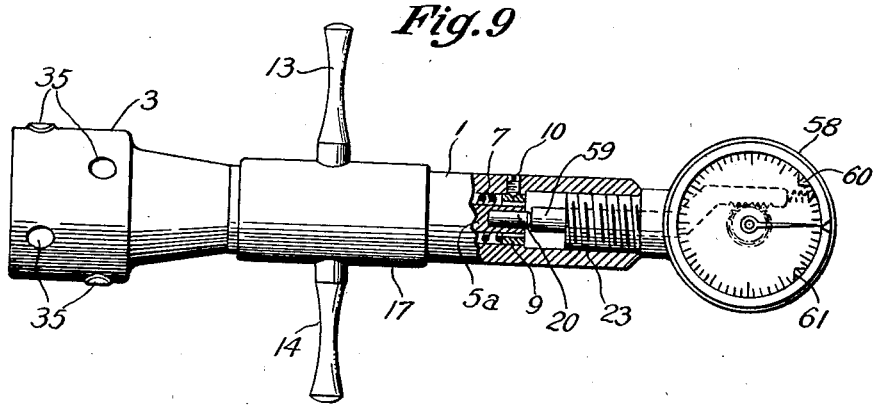

Fig. 9 is a side elevation with parts in section of a micrometer gauge with a dial indicating device which allows a direct reading of the axial displacement of the conical member.

Figure 1:
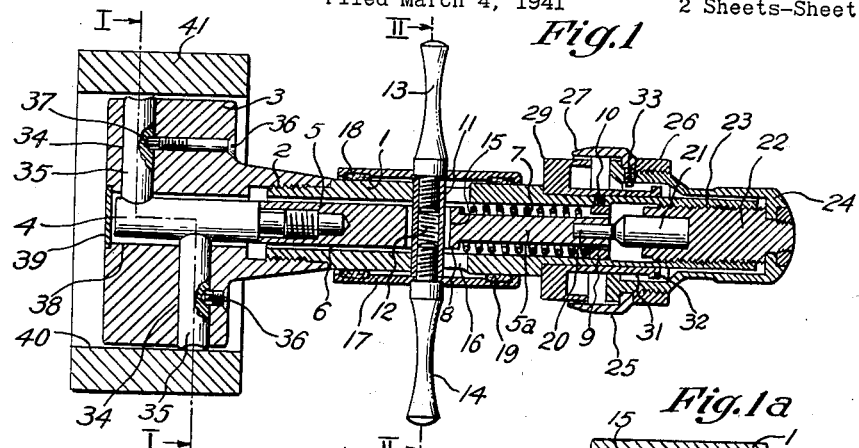
Figure 1 is a central longitudinal section of one form of gauge made in accordance with the present invention.
Figure 1A:
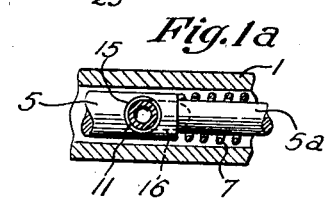
Fig. 1a is a detail of construction shown in longitudinal section.
Figure 2:
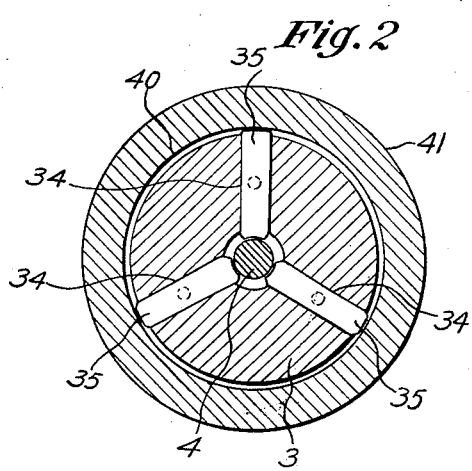
Figs. 2 and 3 are cross sections on the lines I—I and II—II of Fig. 1.
Figure 3:
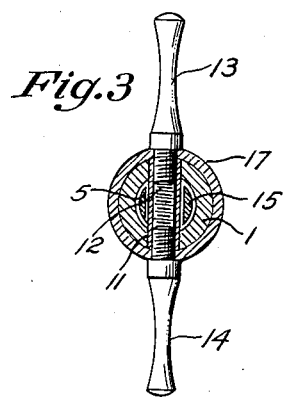
Figure 4:
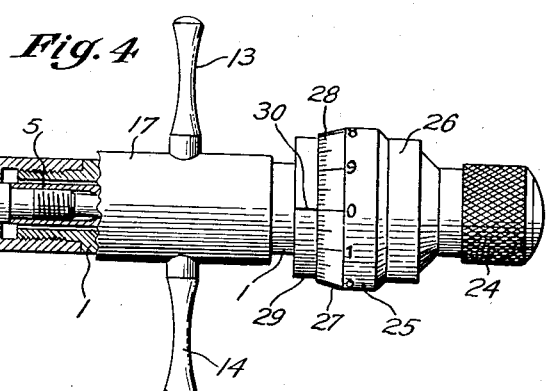
Fig. 4 illustrates partly in section and partly in side elevation a gauge adapted to take measures in bores of great length.

The micrometer gauge shown in Figs. 1 to 3 comprises a tubular casing 1. A head piece 3 adapted to enter the bores to be measured is screwed to the reduce part 2 of the casing 1. In the bore 6 of the casing 1 a shaft 5 is arranged carrying the conical member 4 at its forward end. The shaft 5 has a diameter much less than the bore 6 so that there is sufficient play space and may "float" within the casing 1. The rear end 5a of shaft 5 is reduced in diameter and on this portion of the shaft 5 a conical spring 7 is arranged. One end of spring 7 rests on the shoulder 8 of shaft 5, the other end abuts on a ring 9 held fast in the casing 1 as by means of screws 10.

A tubular member 11 passes through slots 15, 16 of casing 1 and of shaft 5. This member piece 11 is provided with internal screw threads and radially disposed handles 13, 14 are screwed in the opposite ends of said member 11. The slots 15, 16 are large enough to allow the shaft 5 and the conical member 4 a free play in all directions. The shaft 5 and therewith the conical member 4 may be moved in axial direction against the action of spring 7. A sleeve 17 is slidably mounted on the casing 1. The sleeve 17 is connected with the handles 13, 14 and covers the slots 15, 16. Within the sleeve 17 felt packing rings 18, 19 are arranged which prevent dust, etc., entering the slot 16.

The reduced section 5a of the shaft 5 carries a stud 20 acting as an abutment for another stud 21. The latter is fastened to a micrometer nut 22, which is screwed into the screw threaded portion 23 of the casing 1. The nut 22 is provided with a head 24 on which a ring 25 is loosely mounted. The ring 25 may be held in any rotative position on the head 24 by means of a clamping nut 26. The ring 25 is bevelled at 27, in the bevelled portion of which a scale 28 is cut or engraved. The ring 25 reaches over a sleeve 29 fixedly connected with the casing 1. On said sleeve 29 an index or zero line 30 is marked by means of which the rotative position of ring 25 may be read off.

The sleeve 29 is provided with a portion 31 of reduced diameter and with a flange 32. The inner end of a screw 33 on the head 24 projects into the portion 31 and limits, together with flange 32, the outward movement of screw 22. If the screw 33 abuts on flange 32 the studs 20, 21 are separated and the shaft 5 may be axially displaced in the bore 6. Shaft 5 and therewith the conical member 4 may be displaced by placing the rear end of the gauge in the palm of the hand using two fingers to draw the shaft 5 by the handles 13, 14 against the action of the spring 7.

The head 3 is provided with two rows of radial bores 34. Each row comprises three bores 34 distanced equally from each other. In each bore a cylindrical pin 35 is slidably mounted. Each pin 35 is provided with a cross-bore 37 and into this bore 37 projects the end of a screw 36. The screw 36 prevents the falling out of the pin 35 and also limits the inward movement thereof. If the head 3 is screwed on the casing 1 the pins 5 cannot strike against the member 4 when in its withdrawn position. The bore 38 of the head 3 is closed by a plate 39 which prevents the access of dust to the space within the bore 38.

By forcing the hollow cross bolt or sleeve 11 in the slot 16 to the right (Fig. 1) against pressure of spring 7 the member 4 leaves the pins 5 and the head 3 may be inserted in the bore 40 of the work piece 41. To facilitate the introduction of the head 3 in the bore 40 to be measured the outer edge of each pin 35 is rounded off. The pins 35 striking against the edge of bore 40 are pushed inwardly. By releasing the shaft 5, the member 4 is moved forwardly under the action of spring 7. The pins 35 are therefore driven outwardly by the member 4 against the wall of bore 40. The pressure of spring 7 is increased by the slight taper of the member 4. The gauging pins 35 therefore are not only pressed against the wall of the bore with considerable force, but they exert a great reactive force on the member 4. The latter is aligned with the axis of the inner faces of the gauging pins 35. The alignment is made possible by giving the shaft 5, 5a sufficient play in the bore 6 of casing 1 in the ring 9 and the cross bolt 11 in the slot 15. If there were no play and if the shaft 5 tightly fitted the bore 6 the position of the axis of the member 4 would coincide with the axis of bore 6.

In such a case the axis of bore 6 and therefore the axis of the member 4 can only be the axis of the inner faces of the gauging pins 35 if there are no inaccuracies of manufacture. That, however, is practically not possible. On the other hand even a very slight inaccuracy in the position of the axis of the inner faces of the gauging pins 35 with reference to the axis of the member 4 results in a displacement of the gauging pins 35 which is below the true measure as the pins 35 rest with their edges only on the member 4. The decrease in the displacement of the pins 35 is comparatively very great with a flat cone used for the member 4 and results in inaccuracies too great to be allowed for a micrometer gauge destined to measure correctly within $\frac{1}{1000}$ millimeter. Faults and inaccuracies in making the parts are the most important as the heads 3 and prolongation sections 42 presently to be referred to of any length have to be used. By providing a floating member 4 of which the position of its axis depends solely on the position of the inner faces of the gauging pins 35 the desired accuracy may be attained, on the condition that the member 4 and the shaft 5 can sufficiently adjust themselves radially within the bore 6 of casing 1.

If the axis of the faces of the gauging pins 35 is not in true alignment with the axis of the bore 6, the axis of member 4 and shaft 5 may take a slanting position or will be eccentric with reference to the axis of bore 6. An eccentric position of said axis does not diminish the accuracy in any way and with a slanting position the fault in the readings of the gauge is quite negligible, owing to the slight taper of the member 4. If for instance the taper of the member is 4%, the effect of any fault in the axial displacement of the member 4 will be reduced to $\frac{1}{25}$ in the radial displacement of the gauging pins 35. A faulty contacting of the gauging pins with the cone of member 4 on the other hand would be effective in full measure.

The available force to align the member 4 and shaft 5 by the gauging pins is materially increased by the provision of two or more rows of gauging pins 35. The force to set the member 4 in the position desired is quite sufficient when the outer faces of the gauging pins 35 form parts of a cylinder concentric to the axis of the member 4. With one and the same head 3 bores are measured the diameter of which differ but little. The said outer faces therefore do not correspond exactly with all the bores to be measured. To get substantially a linear contact of the gauging pins 35 with the wall of the bore the outer faces of the pins 35 are made to a diameter corresponding to that of the smallest bore to be measured, as shown in Fig. 2 in an exaggerated manner.

The inner faces of the gauging pins cannot conform with the surface of the member in all its positions. To get a line of contact between the conical surface of the member 4 and the inner ends of the gauging pins 35 the inner faces of the pins 35 are made to conform to the surface of the largest portion of the cone as shown in Fig. 2. In Fig. 2 the curvature of the inner face of the gauging pins corresponds to a diameter larger than that at the small end of the conical part of member 4. With each head diameters of bores are measured which differ by about one tenth of a millimeter, the faces of the gauging pins therefore differ in their curvatures but little from the surfaces of the bores and the member 4. For every practical purpose it may be said that these faces conform with the surfaces with which they contact.

In measuring a bore the nut 24 is unscrewed and the member withdrawn from the gauging pins 35 as far as possible and the head 3 is introduced into the bore. The diameter of the head 3 is but little smaller than that of the bore so that the outer faces of the gauging pins 35 give the head 3 a good guidance. The alignment of the member 4 will become perfect by releasing this member 4. The gauging pins 35 are then pressed by means of the taper on member 4 against the wall of the bore and the member 4 itself is thereby centered by the inner faces of the gauging pins. The nut 24 is again screwed inward until the studs 20, 21 touch each other. The result then may be read off the scale 28 on the rim 25. The zero line of the said scale 28 corresponds to the true diameter and may be ascertained by measuring the bore of a reference standard gauge. The ring 25 with scale 28 may be adjusted with reference to the index 30 by turning the ring 25 and fixing it in its proper position by the screw 26. If measurements within a long bore are to be taken an extension piece 42 may be inserted between the tubular casing 1 and the head 3. A member 4 of appropriate length is used which passes with sufficient play through the bore of casing 1 and extension pieces.

After having ascertained the diameter of the work piece 41, the nut 25 is again unscrewed, the member 4 is withdrawn from the gauging pins 35 so that the latter members are free to slide inward into the head. The gauge may be advanced longitudinally in the bore and further measurements may be taken. If measurements are to be made in very long bores, for instance in the bores of gun barrels, a gauge as shown in Figs. 7 and 8 may be used with advantage. In Figs. 7 and 8, 3 denotes the head in which the gauging pins 35 and a taper member 4 are arranged as described above. The gauge, the length of which may attain several yards, is provided with rings 43, 44, 45 and 46 arranged on both sides of the pins 35 to give it a good guidance in the bore. The diameters of these guiding rings are but little less than the diameter of the bore to be measured and they are inter-connected by extension sleeves 47, 48 and 49. The ring 45 is placed in advance of the head 3 in order to guide the said head 3 by introducing it into the bore to be measured. The number of the rings to guide the gauge may be increased and is not limited to the number shown in the drawings. Owing to its length the member 4 possesses a certain flexibility and adapts itself to the position of the gauging pins 35. Also the ring 46 and others give support to the member 4. The rings 45, 46 allow the alignment of the member 4, but prevent a too great deflection. To indicate the position of the gauging pins in the bore to be measured a scale 50 is marked on the surface of the parts 44, 47, 48, 49, the zero point of the scale being in the plane through the center lines of the gauging pins 35. On the casing 1 an abutment 51 for the sleeve 17 is rotatably mounted. The abutment 51 retains the member 4 and if it is turned to the position 52 shown in broken lines the member 4 is brought to bear on the inner faces of the gauging pins 35. The movable abutment obviates the necessity to retain the member 4 by the hand against the action of the spring 7.

The new gauge is adapted for use in determining whether a bore is out of round. The head 3 is provided with but one row of gauging pins. Two or three pins are used at regular distances apart. The same gauge may be used for the most exact measurements to be made, for instance if the diameter of a reference standard gauge bore is to be determined. To attain the highest accuracy in taking measurements a head as shown in Fig. 5 may be used. With a head 3 of the construction described above a conical member 4 is used. The part of the member 4 co-operating with the first row of gauging pins 35 has the correct reference diameter. The diameter of that part of the member 4 at the second row or further back are slightly less than normal. Fig. 5 shows the difference greatly exaggerated. The gauging pins of the second row will not come in contact with the wall of the bore to be measured, but they serve as very good guiding means for inserting the head 3 in the bore.

To determine the diameter of the ball race of a ball bearing ring a member 4 having two conical portions 53, 54 of different taper (Fig. 6) is used. The gauging pins 35 are provided at their inner faces with a bevelled edge 55. The head 5 is inserted in the bore of the ball bearing ring 56 and placed with the gauging pins 35 on the cross-center plane of the ball race. By releasing the member 4, the double taper cone 54 pushes the gauging pins outwardly and near the wall of the ball race. The conical portion 53 of the member 4 then presses the pins 35 against the wall of the ball race at its largest diameter.

With the gauges as described the axial displacement of the conical member may be read from the scale but a dial indicator 58 (Fig. 9) may be used. The indicator is screwed into the bore 13 of the tubular casing 1. The stud 59 is pressed on the stud 20 by a spring which actuates the gears of the indicator and moves the hand over the dial. The result may be read off immediately after releasing the member 4. To facilitate the rapid checking of bores of a great number of like work pieces adjustable markers 60, 61 arranged on the dial and indicating the limits of the allowable differences are provided.

I claim:

1. An internal micrometer gauge comprising in combination, a casing having an opening extending therethrough, a slidable member having its forward conical end mounted for floating axial movement therein, and members radially disposed and movable in said casing, said radially movable members adapted to engage the bore being gauged at their outer ends and to engage the conical end of said slidable member at their inner ends.

2. An internal micrometer gauge comprising in combination, a casing having an opening extending therethrough, a slidable member mounted for free axial movement therein, said slidable member having a steep conical end portion and a slightly conical intermediate portion, and members radially disposed and movable in said casing, said radially movable members adapted to engage the bore being gauged at their outer ends and to engage the slightly conical portion of said slidable member at their inner ends when in gauging position.

3. An internal micrometer gauge comprising in combination, a casing having an opening extending therethrough, a slidable member mounted for free axial movement therein, said slidable member having a steep conical end portion and a slightly conical intermediate portion, and members radially disposed and movable in said casing, said radially movable members adapted to engage the bore being gauged at their outer ends and to engage the steep conical end of said slidable member at their inner ends when being positioned and engaging said slightly conical portion when in their gauging position.

4. An internal micrometer gauge comprising in combination, a casing having an opening extending therethrough, a slidable member having its forward conical end mounted for floating axial movement therein, members radially disposed and movable in said casing, said radially movable members adapted to engage the bore being gauged at their outer ends and to engage the conical end of said slidable member at their inner ends, an anvil on said slidable member opposite the conical end, and micrometer measuring means movable into contact with said anvil to determine the position of said radially disposed and movable members.

5. An internal micrometer gauge comprising in combination, a casing having an opening extending therethrough, a slidable member having its forward conical end mounted for floating axial movement therein, members radially disposed and movable in said casing, said radially movable members adapted to engage the bore being gauged at their outer ends and to engage the conical end of said slidable member at their inner ends, spring means normally forcing said radially movable members toward their gauging positions, an anvil on said slidable member opposite the conical end, and micrometer measuring means movable into contact with said anvil to determine the position of said radially disposed and movable members.

6. An internal micrometer gauge comprising in combination, a casing having an opening extending therethrough, a slidable member having its forward conical end mounted for floating axial movement therein, said slidable member having a steep conical end portion and a slightly conical intermediate portion inclined in the same direction, members radially disposed and movable in said casing, said radially movable members adapted to engage the bore being gauged at their outer ends and to engage the conical portions of said slidable member at their inner ends, an anvil on said slidable member opposite the conical end, and measuring means movable into contact with said anvil to determine the position of said radially disposed and movable members.

7. An internal micrometer gauge comprising in combination, a casing having an opening extending therethrough, a slidable member having its forward conical end mounted for floating axial movement therein, and axially spaced series of radially disposed and movable members in said casing, said radially movable members adapted to engage axially spaced portions of the bore being gauged at their outer ends and to engage different portions of the conical end of said slidable member at their inner ends.

8. An internal micrometer gauge comprising in combination, a casing having an opening extending therethrough, a slidable member having its forward conical end mounted for floating axial movement therein, members radially disposed and movable in said casing, said radially movable members adapted to engage the bore being gauged at their outer ends and to engage the conical end of said slidable member at their inner ends, and guiding means for said casing in advance of and following said radially movable members.

MAX MAAG.